June 1, 1948.  I. R. METCALF  2,442,426
APPARATUS FOR WELDING GEAR WHEELS
Filed Sept. 27, 1944  2 Sheets-Sheet 1
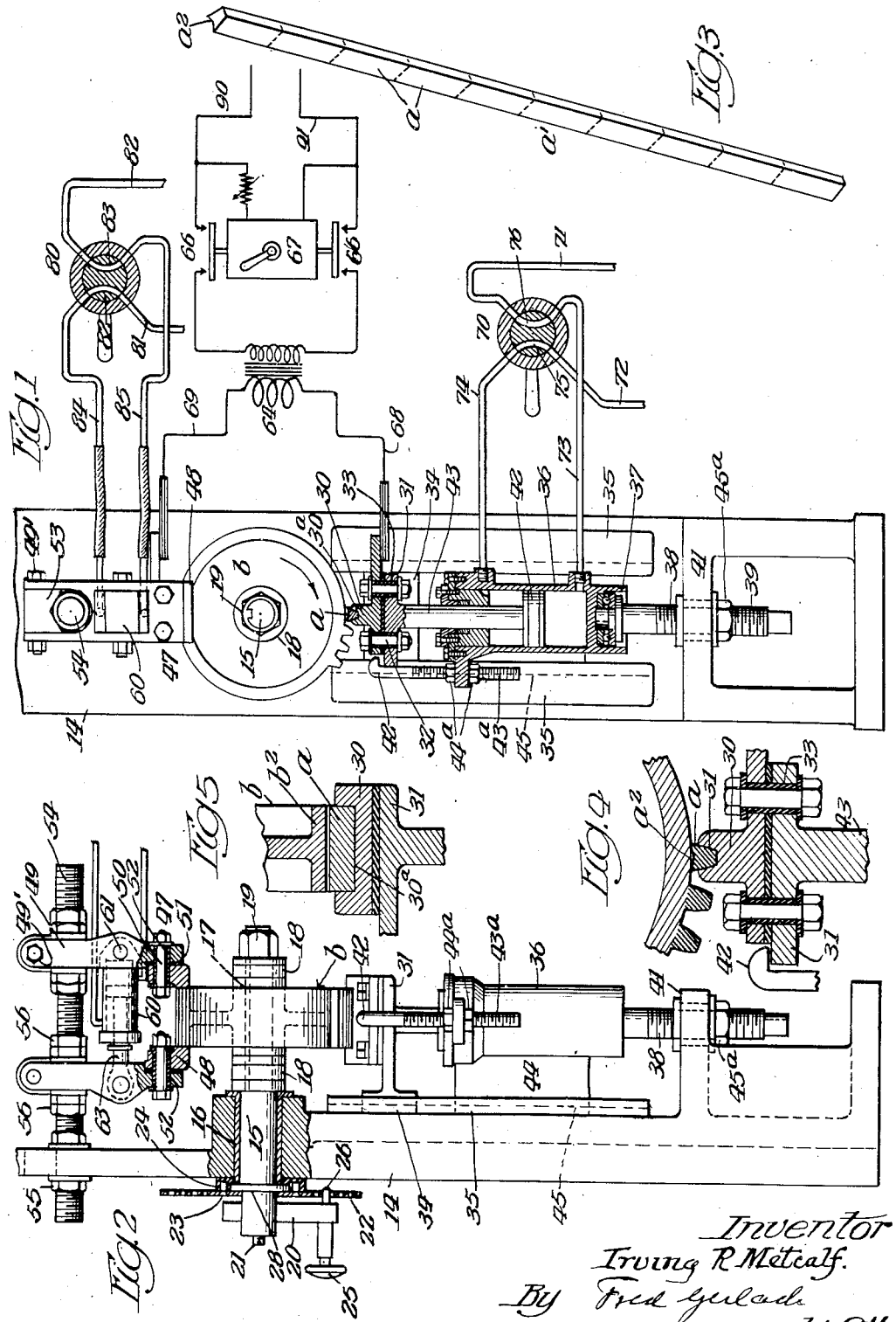
Inventor
Irving R. Metcalf.
By Fred Gulack
his Atty

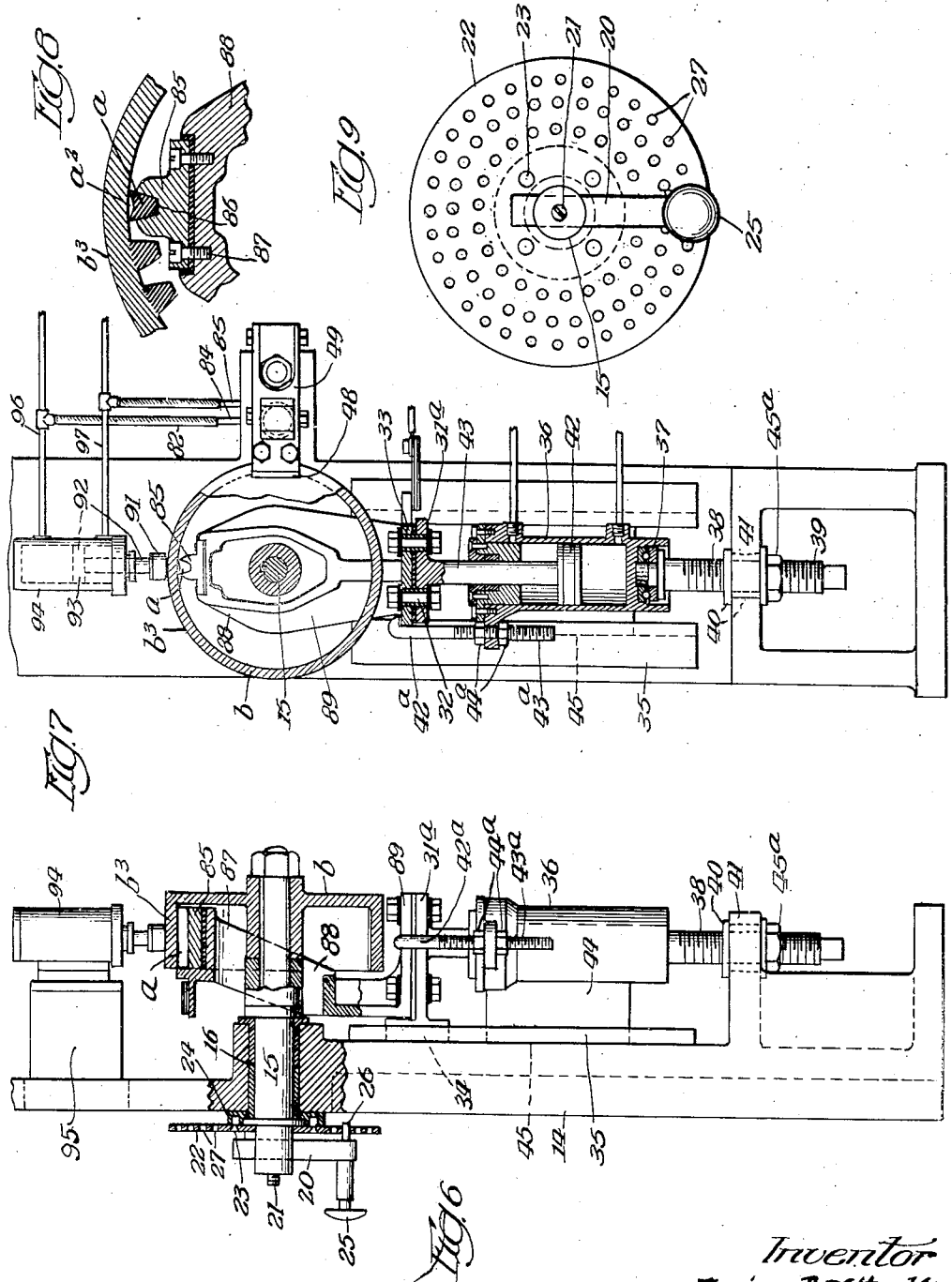

Patented June 1, 1948

2,442,426

UNITED STATES PATENT OFFICE 2,442,426

APPARATUS FOR WELDING GEAR WHEELS

Irving R. Metcalf, Chicago, Ill., assignor to Whiting Corporation, Harvey, Ill., a corporation of Illinois Application September 27, 1944, Serial No. 555,924

11 Claims. (Cl. 219—4)

1

The invention relates to welding teeth on body blanks, for example, for producing gears having gear-teeth welded onto the wheel-body.

In the fabrication of gear-wheels it is advantageous to use teeth cut from lengths of rolled or wrought bars which can be economically fabricated to close tolerance and of metals or alloys having the wear or other properties desirable in the teeth of the gears, and body blanks formed of other metal, for example, cast metal.

One object of the invention is to provide an apparatus for expeditiously welding teeth onto the body-blanks.

Another object of the invention is to provide a method for fabricating elements such as gear-wheels which comprises welding teeth cut from bars of suitable stock onto the body-blanks.

Other objects of the invention will appear from the detailed description.

The invention consists in the several novel features hereinafter set forth and more particularly defined by claims at the conclusion hereof.

In the drawings:

Fig. 1 is a front elevation of apparatus for welding externally tooth gears, parts being shown in section and illustrating diagrammatically the control mechanism for the welding operations.

Fig. 2 is a side elevation of the welding apparatus, parts being shown in section.

Fig. 3 is a perspective of a bar which is cut into sections for forming the teeth to be welded on the wheel-body.

Fig. 4 is a view on an enlarged scale of the tooth position in readiness to be welded to the body.

Fig. 5 is a transverse section of the electrode which carries the tooth to be welded onto the body.

Fig. 6 is a side elevation of an apparatus for welding internally tooth gears, parts being shown in section.

Fig. 7 is a front elevation of the apparatus shown in Fig. 6, parts being shown in section.

Fig. 8 is a detail section illustrated on an enlarged scale of a tooth in position to be welded to the internal periphery of the rim of the wheel-body.

Fig. 9 is a detail of the indexing device for the wheel-body.

In fabrication, a bar $a'$ of suitable stock which has been shaped, usually by rolling so its sides and outer face correspond to the tooth profile desired, and its base is slightly V-shaped, as at $a^2$, is cut into short lengths to form gear-teeth $a$, and these teeth are welded to the rim of the wheel-body $b$, which may be formed by casting. These bars can be accurately rolled or shaped with close tolerance so that little or no machine work is necessary in finishing the gear-wheels.

2

The apparatus for welding the teeth $a$ to the body $b$ for producing an externally toothed gear-wheel, illustrated in Figs. 1 to 5 and 9, comprises generally a supporting frame; means for rotatably supporting the wheel-body $b$; a hydraulically operable electrode which carries the teeth and is adapted to move them into welding relation with the rim on the wheel-body; a second electrode which is adapted to be clamped into contacting relation with the wheel-body; an indexing device for rotatably positioning the wheel-body for successively welding teeth around the rim of said body; means for controlling the welding current to the electrodes; and hydraulic means for controlling the movement of the electrodes for welding.

A shaft 15 is journaled in a bushing 16 of insulating material, which is confined in a supporting frame 14. The hub of the wheel-body $b$ is secured by a key 17 for rotation with shaft 15 and is fixedly positioned longitudinally and removably held on said shaft by spacers 18 and a nut 19.

The indexing device for positioning the wheel-body for successively welding teeth thereon comprises a crank 20 which is radially adjustable in one end portion of shaft 15 and fixed therein by a set screw 21, a non-rotatable disk 22 which is fixed by screws 23 to a ring 24 of insulating material which is fixed to the frame 14. The crank 20 slidably carries a handle 25 which is provided with a slidable pin 26. Pin 26 is adapted to enter holes 27 in the disk 22 and to lock said crank, the shaft 15, and the wheel-body on said shaft against rotation. The holes 27 are arranged to index the wheel-body into positions corresponding to the spacing of the teeth desired on said body. Several series of holes 27 of different radii are provided for different tooth spacing. The crank 20 is radially adjustable so that the pin 26 can be set to register with the holes 27 of any annular series for indexing the wheel-body for welding thereon a series of teeth in different numbers or with different spacings on the body. An annular shoulder 28 on shaft 15 is confined between disk 22 and the outer end of bushing 16 for securing said shaft against axial movement in the frame 14.

An electrode 30 is provided in its upper face with a recess $30^a$ which is adapted to receive and retain a tooth $a$ which is to be welded to the wheel body $b$ in aligned relation with the rim $b^2$ of said body. Electrode 30 is movable vertically from a position below the wheel-body so it can be loaded with a tooth $a$ and with the tooth into an elevated position so it will be welded to said body on a predetermined pitch radius. Electrode 30 is mounted on a head 31 which is insulated from said electrode by a strip of insulating material and on which said electrode is secured by bolts 32 which extend through sleeves 33 of insulating material, for electrically insulating the electrode from said head. Head 31 is provided with a guide 34 which is vertically movable in a slideway 35 on frame 14. Electrode 30 and head 31 are shifted downwardly away from wheel-body $b$ for loading the electrode with the teeth and upwardly to position the tooth for welding it to said body by hydraulic means which comprises a cylinder 36 and a piston 42 in said cylinder and connected by a stem or piston rod 43 to the head 31. Cylinder 36 is supported on a thrust bearing 37 on the upper end of a stem 38 which is provided with a screw thread 39 for engaging a nut 40 which is fixed in a forwardly projecting member 41 of the frame 14. Cylinder 36 is provided with a guide 44 which fits in a vertical slideway 45 in the frame 14. A stop 42 is adapted to be engaged by head 31 for limiting the upward stroke of electrode 30 for the pitch radius on which the teeth $a$ are welded to the wheel-body $b$. Stop 42 is formed on the screw 43$^a$ which is adjustably locked by nuts 44$^a$ to the cylinder 36 so that the electrode and the tooth carried thereby will be arrested in position for welding the tooth on the desired pitch radius. The cylinder 36 can be locked by a nut 45$^a$ into its adjusted position.

A second electrode 47 comprises a pair of sections or members 48 which are adapted for clamping contact with the side faces of the rim $b^2$ of wheel-body $b$. Each electrode member 48 is secured to arm 49 by bolts 50 and is electrically insulated from said arm by a plate 51 and sleeves 52. Each arm 49 is fulcrumed by a pin 49' on a collar 53 which extends around and is supported by a screw threaded rod 54, one end of which is adjustably secured by nuts 55 in the frame 14. Each collar 53 is clamped between nuts 56 on rod 54 so that the fulcrum pins 49' may be spaced apart and positioned for parallel engagement of the contacting faces of the electrode members 48 and the rim $b^2$ of body $b$ or rims of different thickness. The electrode 47 is operable into and out of clamped contact with the wheel-body by a hydraulic cylinder 60 which has one of its ends pivoted by a bolt 61 to one of the arms 49 and a piston 62 which is slidable in said cylinder and is provided with a stem 63 which is pivoted to the other arm 49. Fluid under pressure into one end of cylinder 60 is adapted to spread arm 49 and electrode members 48 away from the rim of the wheel-body to release the wheel-body during indexing movements, and fluid under pressure in the opposite end of the cylinder is adapted through arms 49 to press electrode members 47 into firm contact with the side-faces of the rim $b^2$ of the wheels. Welding current is supplied to the electrodes from a transformer 64 which is connected by conductor 68 to the electrode 30 and by conductor 69 to both of the electrode members 48. The welding circuit is through the conductor 68, electrode 30, the tooth $a$ therein, the wheel-body $b$, electrode member 48 and conductor 69.

The piston 42 is hydraulically operated in cylinder 36 by fluid under pressure from a valve 70 which is connected by a pipe 71 to a source of fluid under regulated or predetermined pressure such as a pump (not shown) and a return flow pipe 72. The casing of valve 70 is connected by pipes 73, 74 to the ends of cylinder 36, respectively, for alternately delivering fluid under pressure to and exhausting it from the opposite sides of piston 42. Valve 70 is provided with ports 75, 76 which are adapted, by rotation, to supply fluid from pipe 73 to either end of cylinder 36 and simultaneously exhaust it from the other end of said cylinder for the two-way operation of piston 42 and electrode 30.

A valve 80 is connected to receive fluid under regulated or controlled pressure from a pipe 81 which is connected to a source of fluid under pressure and is connected to an exhaust pipe 82 for the two-way operation of the piston 62 in cylinder 60 which are adapted to shift the members of electrode 47. Valve 80 is provided with ports 82, 83 by which fluid under pressure from pipe 81 may be selectively conducted to either of the pipes 84, 85 which are carried to the ends of cylinder 60, respectively, and by which fluid may be exhausted from either end of said cylinder.

The supply of welding current to the transformer 64 is controlled by a timer and contactor 67 which simultaneously close and open contacts 66 which are adapted to connect line-conductors 90, 91 to the primary coil of the transformer 64.

The operation will be as follows: While the arms 49 are spread apart, the body $b$ will be slipped onto the shaft 15 and secured thereon by spacers 18 and 19, so the rim $b^2$ will be vertically aligned with teeth $a$ placed in the electrode 30. The electrode 30, while in its lowered position, will be loaded with a tooth $a$. The crank 20 will be rotated to secure the wheel-body into an indexed position. Valve 80 will then be operated to deliver fluid under pressure through pipe 84 into one end of and exhaust fluid through pipe 85 from the other end of cylinder 60. This will draw arms 49 together and clamp the electrode members 48 into pressure contact with the side faces of rim $b^2$. Valve 70 will be operated to deliver fluid under pressure via pipe 73 into the lower end of and to exhaust fluid via pipe 74 from the upper end of cylinder 36. This will raise piston 42 and move electrode 30 upwardly until the base of tooth $a$ in electrode 30 will be pressed against the outer periphery of rim $b^2$ of the wheel-body $b$. The welding circuit will then be closed at contacts 66 for a period determined by the timer 67 and current from the transformer 64 will flow through conductor 69, electrode member 48, wheel-body $b$, tooth $a$, electrode 30, and conductor 68, until the tooth $a$ has been welded on the rim $b^2$. The timer will automatically open the welding current at contacts 66 at the end of a predetermined period. During this welding, the corners of the base of the tooth $a$ and a portion of the rim $b^2$ will be melted together, and metal will flow into the V-shaped face on the base of the tooth $a$ while the tooth base is pressed toward the rim by the fluid in cylinder 36 until the head 31 strikes stop 42 which will correct the movement of the tooth toward the rim $b^2$, and control the weld to autogeneously join said tooth to said rim at the desired predetermined pitch-radius. Valve 80 will then be operated to spread electrode-members 48, and valve 70 will be hydraulically operated to lower electrode 30 away from the welded tooth. The wheel-body will then be indexed into position for the next tooth and the electrode will be loaded with another tooth. The same cycle of operations of the electrodes and the welding circuit will then be repeated for each succeeding tooth $a$ until the entire series of said teeth has been welded onto the body $b$ to complete the gear-wheel.

Figs. 6, 7 and 8 illustrate a modified form of the invention, for producing internally toothed gears, in which the indexing device, for the wheel-body, the hydraulic mechanism for shifting the tooth-carrying electrode, the clamping electrode, hydraulic controls, and welding circuit control are of the construction already described. The wheel-body is provided with a rim $b^3$ having an internal periphery to which the teeth $a$ are welded, and a hub which is secured on shaft 15 by spacers 18 and a nut 19. The tooth-carrying electrode 85 is provided with a recess 86 for a tooth $a$, and is secured by screws 87 to bracket 88 which straddles the shaft 15 and the spacers 18 on said shaft, and has a base 89 which is secured on and insulated from the head 31, which is supported for vertical movement and hydraulically operated by a piston 42 in a cylinder 36 as previously described.

The clamping electrode-members 48, their supporting arms 49, rod 54 on which said arms are adjustably supported, and the cylinder 60 and piston 62 which are of the same construction described, are mounted at one side of frame 14, so that said members will pressure-contact the side-faces of rim $b^3$.

An auxiliary pressure device, for exerting pressure on the rim $b^3$ in opposition to the upward pressure exerted by the electrode 85 and the tooth therein, comprises a plunger 91 of insulating material on the stem 92 of a piston 93, and a cylinder 94 in which said piston is slidable. This cylinder is supported from the frame 14 by a bracket 95 which is vertically adjustable in said frame, to adapt the device for rims of different diameters. The piston 93 is operated by fluid under pressure delivered into the opposite ends of cylinder 94 by pipes 96, 97 which may be connected to pipes 84, 85 so that this auxiliary pressure will be conjointly controlled with the clamping electrodes 47.

In operation, the wheel-body, to which the teeth are to be welded, is secured on the shaft 15 while electrode 85 is lowered, the clamping electrode members 48 are spread apart, and the plunger 91 is in its raised position out of engagement with the rim $b^3$ of the wheel-body. A tooth $a$ then is placed in the recess 86 of the electrode 85. The plunger 91 of the auxiliary clamping device is then hydraulically operated to engage the outer periphery of rim $b^3$, the clamping electrode members 48 are hydraulically operated into pressure-contact with the side-faces of rim $b^3$, and the head 31, electrode 85 and the tooth therein are hydraulically raised to press said tooth against the inner periphery of rim $b^3$. The welding circuit through electrodes 85, tooth $a$, the wheel-body and electrode members 48 is then closed to weld the base of the tooth on the inner periphery of rim $b^3$. The stop 42 limits the movement of electrode-members 48 toward rim $b^3$ and determines the pitch radius of the tooth. The electrode 85 is then hydraulically lowered, the electrode-members 48 are spread apart, and the plunger 91 is raised. The wheel-body is then indexed to bring its rim into position for welding the next tooth thereon. This cycle of operations is repeated for each tooth, until the gear-wheel is completed.

The vertical adjustability of cylinder 36 adapts the machine for welding teeth on wheel-bodies of different diameters. The adjustability of arms 49 for the electrode-members 48, adapts the machine for pressure-contact of said members with wheel-bodies having rims of different widths. The auxiliary pressure device adapts the machine for internally welding teeth on the inner periphery of a wheel-body to produce internally toothed gears. The adjustable stop 42 provides for forming the welds between teeth and the wheel-body with a predetermined flow of metal to produce different welds and to weld the teeth on a uniform pitch radius on each wheel-body and its adjustability makes it possible to accurately control such flow. The pressure contact between the clamping electrode and the wheel-body and between the tooth and the wheel-body insure proper conduction of current during the welding operations.

The invention exemplifies apparatus for expeditiously and uniformly welding teeth cut from a bar having a cross-sectional shape conforming to the tooth-profile of gear-teeth, to a wheel-body; which comprises means for accurately controlling the welds to weld the teeth to the wheel-body on a uniform pitch radius; which comprises a hydraulically operated tooth-carrying electrode; and hydraulically operated electrode-members for pressure contact with the wheel-body; which is adjustable for welding teeth on different pitch radii or rims of different diameters; and which is simple in construction and different in operation.

The invention is not to be understood as limited to the construction described, since this can be varied within the scope of the appended claims without departing from the spirit and scope of the invention. While the invention has been particularly described for welding teeth on wheel-bodies, it may be used in welding teeth on other mechanical elements.

Having thus described the invention, what I claim as new and desire to secure by Letters Patent is:

1. Welding apparatus comprising means for supporting a body for welding teeth thereon, a movable electrode provided with means for holding a tooth thereon, fluid pressure operable means for shifting said electrode to move the tooth thereon into position for welding it to said body, a second electrode, means for contacting said second electrode with said body, and means for passing electric welding current through said electrodes, tooth and body for welding the tooth on the body.

2. Welding apparatus comprising means for supporting a body for welding teeth thereon, a movable electrode provided with means for holding a tooth thereon, fluid pressure operable means for shifting said electrode to move the tooth thereon into position for welding it to said body, a second electrode, means for contacting the second electrode with said body, and means for passing electric welding current through said electrodes, tooth and body for welding the tooth on the body, and means for controlling the movement of said first mentioned electrode toward the body, during the welding operation.

3. Welding apparatus comprising means for supporting a body for welding teeth thereon, a movable electrode provided with means for holding a tooth thereon, means for movably supporting and moving said electrode to press the tooth thereon into position for welding it to said body, a second electrode, means for contacting the second electrode with said body, means for passing electric welding current through said electrodes, tooth and body for welding the tooth on the body, and a device for indexing the body for successively welding teeth thereon, said device including a non-rotatable wheel provided with means for variably indexing the body for teeth having different pitch spacing.

4. Welding apparatus comprising means for supporting a body for welding teeth thereon, a movable electrode provided with means for holding a tooth thereon, fluid-pressure operable means for movably supporting and moving said electrode to press the tooth thereon into position for welding it to said body, a second electrode, fluid-pressure operable means for contacting the second electrode with said body, and means for passing electric welding current through said electrodes, tooth and body for welding the tooth on the body.

5. Welding apparatus comprising means for rotatably supporting a wheel-body having a peripheral face on which teeth can be welded and side-faces, an electrode provided with a seat for holding a tooth thereon, means for shifting said electrode to move the tooth thereon into position for welding it to the peripheral face on the wheel-body, a second electrode comprising a pair of relatively movable members for engaging the side faces of said wheel-body, means for shifting said members into contact with said side-faces, and means for passing welding current through said electrodes, tooth and body, for welding the tooth on the body.

6. Welding apparatus comprising means for rotatably supporting a wheel-body having an external peripheral face on which teeth can be welded and side-faces, an electrode provided with a seat for holding a tooth thereon, means for shifting said electrode to move the tooth thereon into position to be welded to the external peripheral face on the wheel-body, a second electrode comprising a pair of relatively movable members for engaging the side-faces of said wheel-body, means for shifting said members into contact with said side-faces, and means for passing welding current through said electrodes, tooth and body, for welding the teeth on the body.

7. Welding apparatus comprising means for rotatably supporting a wheel-body having a peripheral face on which teeth can be welded, an electrode provided with a seat for holding a tooth thereon, means operable by fluid under pressure for shifting said electrode to move the tooth thereon into position to be welded to the peripheral face on the wheel-body, a second electrode comprising a pair of movable members for engaging the side-face of said wheel-body, means operable by fluid under pressure for shifting said members into engagement with said side-faces, means for passing welding current through said electrodes, tooth and body, for welding the teeth on the body, and means for limiting the movement of the tooth relatively to the body during each welding operation.

8. Welding apparatus comprising means for supporting a body for welding teeth thereon, an electrode provided with means for holding a tooth thereon, a movable support on which said electrode is mounted for moving the tooth into position for welding it to the body, an adjustably supported hydraulic cylinder, a piston in said cylinder for shifting said support and electrode to shift the tooth into position for welding it to said body, means on the cylinder for limiting the movement of said electrode and the tooth toward said body during the welding operation, and means comprising a second electrode having pressure contact with the body, for passing welding current through the electrodes, tooth and body, for welding the tooth on the body.

9. Welding apparatus comprising means for supporting a wheel-body having side faces, an internal peripheral face on which teeth can be welded, and an outer peripheral face, a movable electrode provided with a seat for a tooth, means for shifting said electrode to move the tooth thereon into position for welding it to said internal face, means for engaging the wheel-body in opposition to the pressure exerted thereon by said tooth, a second electrode for engaging the side-faces of said body, means for shifting said second electrode into pressure contact with said side-faces, and means for passing welding current through said electrodes, tooth and body, for welding the tooth on the body.

10. Welding apparatus comprising means for supporting a wheel-body having side faces, an internal peripheral face on which teeth can be welded, and an outer peripheral face, a movable electrode provided with a seat for a tooth, means for shifting said electrode to move the tooth thereon into position for welding it to said internal face, means for engaging the wheel-body in opposition to the pressure exerted thereon by said tooth, a second electrode comprising members for engaging the side-faces of said body, means for shifting said members into pressure contact with said side-faces, and means for passing welding current through said electrodes, tooth and body, for welding the tooth on the body.

11. Welding apparatus comprising means for supporting a wheel-body having side faces, an internal peripheral face on which teeth can be welded, and an outer peripheral face, an electrode provided with a seat for a tooth, hydraulic means for shifting said electrode to move the tooth thereon into position for welding it to said internal face, means for engaging the wheel-body in opposition to the pressure exerted thereon by said tooth, a second electrode for engaging the side-faces of said body, hydraulic means for shifting said second electrode into pressure-contact with said side-faces, means for passing welding current through said electrodes, tooth and body, for welding the tooth on the body, means for limiting the movement of the tooth toward the inner peripheral face during the welding operations, and means for indexing the wheel for successively welding the teeth thereon.

IRVING R. METCALF.

REFERENCES CITED

The following references are of record in the file of this patent:

UNITED STATES PATENTS

| Number | Name | Date |
|---|---|---|
| 1,233,688 | Murray | July 17, 1917 |
| 1,994,701 | Hall (1) | Mar. 19, 1935 |
| 2,024,597 | Pfeiffer | Dec. 17, 1935 |
| 2,066,791 | McBain | Jan. 5, 1937 |
| 2,154,243 | Langhaus | Apr. 11, 1939 |
| 2,218,197 | Hall (2) | Oct. 15, 1940 |
| 1,008,628 | Brown | Nov. 14, 1911 |
| 1,703,541 | Pierson | Feb. 26, 1929 |
| 1,956,841 | Walmsley | May 1, 1934 |
| 2,126,490 | Martin | Aug. 9, 1938 |